United States Patent [19]
Hallerberg

[11] 3,927,744
[45] Dec. 23, 1975

[54] CAGE FOR OVERRUNNING ROLLER CLUTCH

[75] Inventor: Karl Josef Hallerberg, Plankstadt, Germany

[73] Assignee: Borg-Warner, GmbH, Heidelberg, Germany

[22] Filed: Aug. 27, 1974

[21] Appl. No.: 501,106

[30] Foreign Application Priority Data
Sept. 6, 1973  Germany............................ 2344960

[52] U.S. Cl. ................................................ 192/45
[51] Int. Cl.² ........................................... F16D 41/06
[58] Field of Search..................... 192/45; 188/82.84

[56]  References Cited
UNITED STATES PATENTS
3,055,472  9/1962  Sauzedde............................. 192/45
3,241,641  3/1966  Cowles................................. 192/45
3,339,687  9/1967  Cowles................................. 192/45

Primary Examiner—Allan D. Herrmann
Attorney, Agent, or Firm—Herman E. Smith

[57] ABSTRACT

A cage for a roller clutch is formed from a flat stamping having an annular portion with the tab-like projections extending generally radially from the inner and outer edges of the annular portion, the tab-like projections being arranged to permit the stamping of small diameter cages and, when folded, to provide retaining means for the rollers and energizing springs.

8 Claims, 5 Drawing Figures

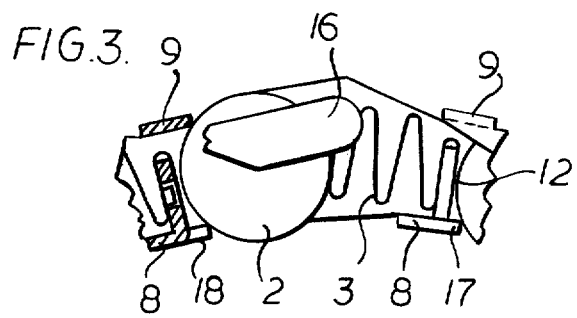
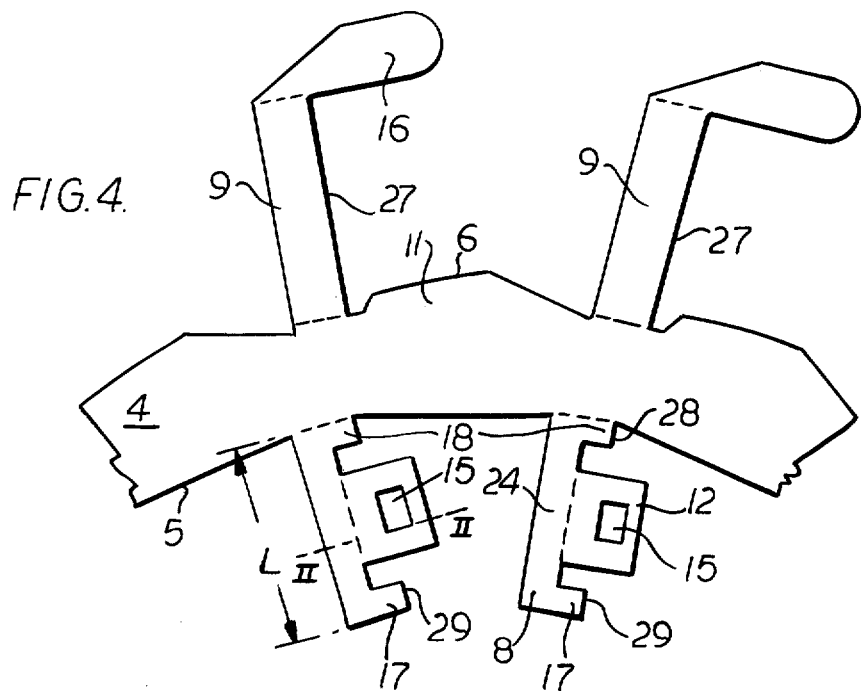
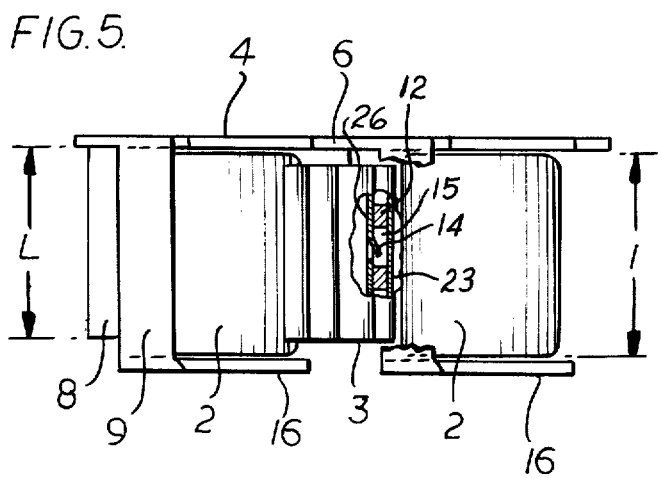

CAGE FOR OVERRUNNING ROLLER CLUTCH

BACKGROUND OF THE INVENTION

The invention relates to a cage for overrunning roller clutches in which a pleated energizing spring is associated with each roller and which includes an annular side plate having tabs on the inner and outer edges bent at an angle from the side plate so as to extend axially with respect to the shaft, of which an inner and an outer tab together with a respective energizing spring form retaining means for a roller.

It is known to provide cages from stampings for overrunning roller clutches and to mount pleated springs for the rollers on the cage. In one form of overrunning clutch the cage is composed of two sideplates, and of separately produced axial connecting members so that inserting, positioning, and forming operations are required when they are assembled.

A more desirable cage design includes a single annular side plate which has folded over tabs on its inner as well as outer rims, pairs of which form a pocket for retaining an energizing spring, and which together with the energizing spring provide retaining means for a roller. But this embodiment also has disadvantages. The inwardly extending tabs have not less than four, and the outwardly extending tabs have three bending edges, so that a complicated multi-stage stamping tool is required for the production of the cage. Moreover, this cage design can be produced for relatively large diameters only, due to the inwardly directed tabs which are rather long before bending, that is, at least for a ratio of the inner diameter of the cage d to the length of the roller 1 of about $d/1=9$. The axial webs, formed from the bent flanges require further a considerable extension in the circumferential direction, so that the number of rollers and therefore the torque capacity are limited. Finally, the energizing springs are not secured sufficiently against being dislodged from their retaining pocket by centrifugal force during rotation of the cage.

SUMMARY OF THE INVENTION

The present invention provides a cage which eliminates the above disadvantages and which can be produced in a simpler way and which results in improved performance.

According to the present invention the length L of the inner tabs is approximately equal to the length of a roller 1, and the inner tabs have lugs located on their center portions, preferably bent radially with respect to the cage for the attachment of its energizing springs. The energizing springs are provided with U-shaped ends which are clipped onto the lugs of the center portions. In addition the U-shaped ends have tongues alligned with the inner tabs which engage lockingly into the rectangular openings of the lugs. Deviating from the state of the known prior art, the energizing springs are thus not clamped into two pockets formed by two bent over tabs, but are always slid over one of the tabs where they are elastically wedged in by means of the bent tongue and are thus lockingly secured against shifting in all directions. The tongues of the pleated energizing springs which attach to the lugs, preferably extend away from the side plate. The lateral edges of the tongues can rest against the upper and lower edges of the rectangular openings in the lug, and the front edge of the tongue can rest against the edge of the opening remote from the side plate. Movement of the spring is thus restricted in three directions. Movement of the spring in the fourth direction is limited by the side plate. Securing the springs in radial direction against centrifugal forces is especially expedient in this case.

In a further embodiment of the invention, the outer tabs are provided with legs at their ends, which form guides for the roller which are bent laterally to extend parallel with the side plate. This outer tab has only two bends as is equally the case with the inner tab.

The design of the tabs for receiving the springs and rollers makes it possible to keep the circumferential extent of the tab low so that the clutch can hold more rollers and thus sustain a higher tongue. Due to the design of the tabs with only two bends, a simpler and cheaper stamping tool is required for the production of the cage. The cage is produced from a sheet metal stamping by stamping the basic form in a single plane and subsequently bending the tabs and lugs as well as the legs. Further, it is possible to reduce the proportion of the inner diameter of the cage d to the length of the roller 1 to about $d/1=4$ which is of great advantage. Small diameters of the cage can be produced in relation to the size of its roller.

Inner and outer radial retention of the spring loaded roller in the cage where the cage is not inserted in the clutch can be provided by projections arranged at the beginning and end of the inner tab and by means of the edge of the outer tab facing the roller. The rollers are retained in the cage thereby, even if the cage is not assembled in a clutch. This is an advantage for the transportation and storage of ready made preassembled cage assemblies.

It is of advantage, if the side plate is provided with projecting portions on the inner or outer rim of the annular portion which can be fitted into respective recesses in the inner or outer race of the clutch. The roller retainer formed in the tabs on one rim of the side plate are offset relative to the retainers formed on the other rim of the side plate so that the rollers do not extend beyond the contour of the projecting portions when engaged with both inner and outer retainers. The recesses into which the projections of the side plate are fitted, are suitably formed by the clamping ramps and inclined surfaces of a race. This is desirable for assembly of the cage assembly provided with rollers in the clutch. The cage assembly provided with rollers is then fitted into the clutch race provided with clamping ramps and inclined surfaces, which is accomplished without difficulties, since the rollers do not extend beyond the cage projecting portion, and then the race of the clutch having the cylindrical surface is introduced while turning which thereby moves the rollers against the springs.

The invention is described in more detail hereinafter in terms of an exemplary embodiment illustrated in the drawings.

BRIEF DESCRIPTION OF THE DRAWINGS

FIG. 3 is a fragmentary view of the cage without inner and outer races;

FIG. 4 is a fragmentary view of a cage stamping in a single plane; and

FIG. 5 is a fragmentary top view of the cage without the inner and outer races.

DESCRIPTION OF THE PREFERRED EMBODIMENTS

Figure 1:
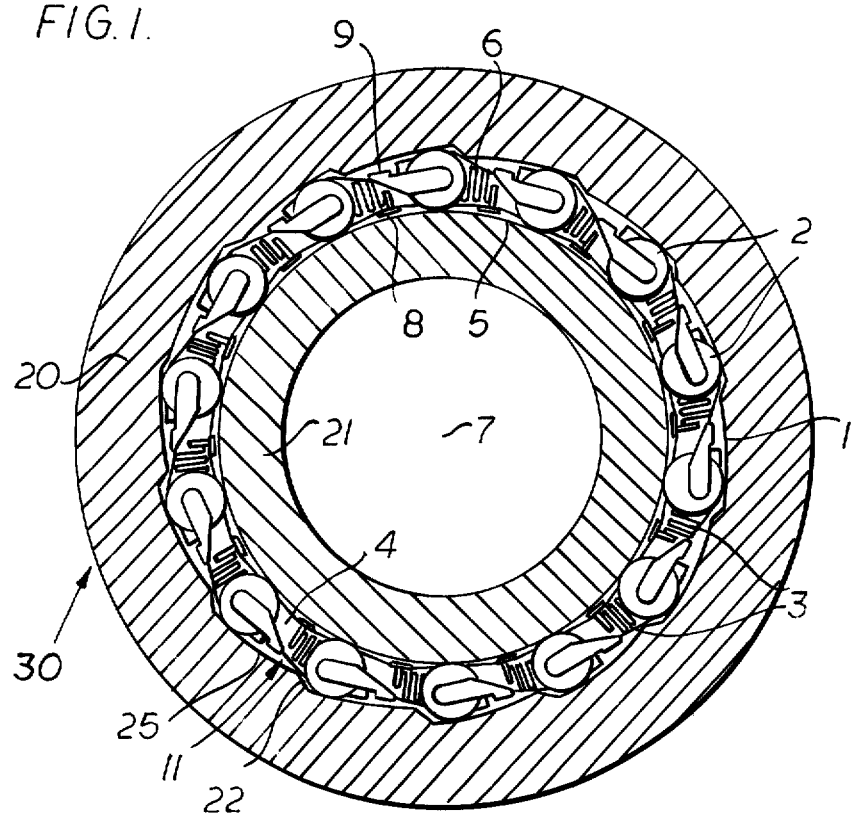
FIG. 1 shows the cage according to the present invention in assembly in an overrunning clutch.

The overrunning clutch 30 shown in FIG. 1 includes an outer race 20, and inner race 21, and the cage 1 with grip rollers 2 and springs 3 between the races. The outer race 20 and inner race 21 are illustrated in cross section. The cage 1 includes the annular side plate 4 which has tabs 8 and 9 on its inner rim or edge 5 and its outer rim or edge 6, which extend axially with respect to the shaft 7, forming together with energizing springs 3, means for retention of rollers 2. The side plate 4 has projecting portions 11 on its outer edge or rim 6 which fit into the recess provided for the rollers formed by the clamping ramps 25 and respective inclined surfaces 22 in the outer race 20 of its clutch 30, where the projecting portions 11 occupy less than the entire clamping ramp 25 and inclined surface 22.

Figure 2:
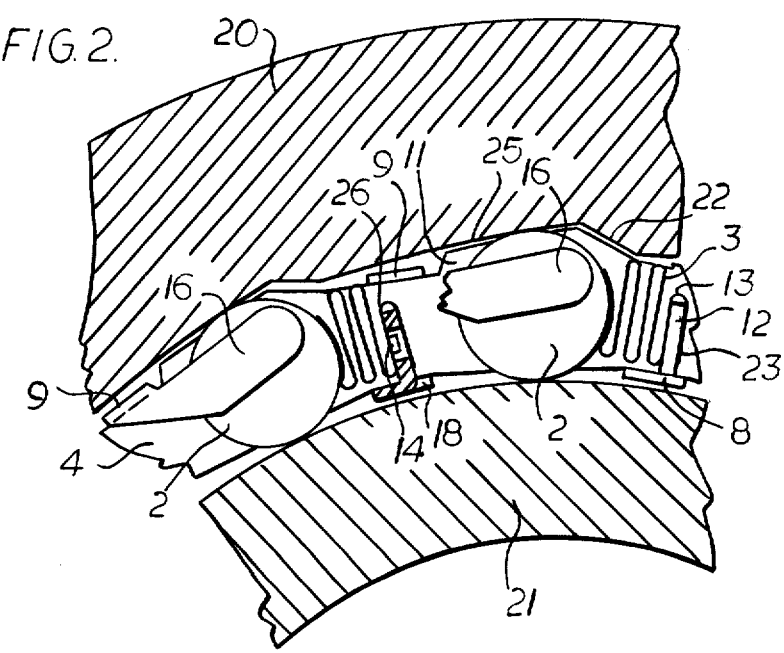
FIG. 2 is an enlarged fragmentary view of a portion of the overrunning roller clutch.

The mutual positions of the projecting portions 11, the clamping ramps 25, and of the inclined surfaces 22 and also their design are more clearly visible in FIG. 2. The inner tabs 8 suitably form the webs for attachment of energizing springs 3. The length L of the inner tabs 8 (see FIGS. 4 and 5) corresponds to approximately the length of the rollers 1. The tabs 8 have lugs 12 in their center portions 24 on which the energizing springs are clipped by their U-shaped ends 13. The lugs 12 are bent radially outwardly. The energizing springs 3 preferably have rectangular tongues 14 in the legs 23 of the U-shaped ends 13 which extend into openings 15 in lugs 12. The tongues 14 are made in a simple manner by shearing on three sides and bending an appropriate part of the spring. The fourth side of the tongue 14 which remains connected with the spring 3 lies to the side of the spring extending toward side plate 4. The springs 3 are thus restrained as to radial and axial movement with respect to the cage after suitable installation of the springs by sliding them on the lugs 12. The position of the tongue 14 with a tab 8 is shown in FIG. 2 by means of a suitable section taken along the line II—II of FIG. 4 and by means of breaking away part of an outer tab 9. The tongue 14 is arranged in this example on the inner leg 26 by which the same affect is obtained as if the tongue 14 were stamped in the outer leg 23.

The outer tabs 9 have legs 16 formed on the ends thereof which are bent sidewise with respect to tab 9 and extend parallel to side plate 4. The legs together with side plate 4 guide the rollers 2 and prevent the rollers from cocking as well as from sliding out of the cage 1. The bending line of tabs 8 and 9 are shown in broken lines in FIG. 4.

In a preassembled cage prior to installation in a clutch, as shown fragmentarily in FIG. 3, the rollers 2 are urged into their outermost position by the springs 3. The rollers 2 are then in a position to rest on the tabs 8 and 9. The inner tabs 8 are provided with projections 17 and 18 on their outer ends for this purpose, the position of which is shown in FIG. 4. As a result of offsetting the inner and outer tabs 8 and 9 on the side plate 4, the rollers 2 do not project beyond the outer contour of cage 1 formed basically by the edge 6. The above mentioned advantages are realized while mounting cage 1 in the clutch 30.

The above mentioned offsetting of tabs 8 and 9 is clearly shown in FIGS. 2 through 5. The offsetting determines the position of the edges of tabs 8 and 9 which face the rollers. These are the edges 27 on tabs 9 and edges 28, 29 on projections 17 and 18 of tabs 8.

A fragmentary top view of a cage without inner and outer races is shown in FIG. 5 in order to illustrate the position of rollers 2 in relation to the tabs 8 and 9. On the right hand side of FIG. 5 the tabs have been omitted so that spring 3 becomes fully visible. The rollers 2 are spaced laterally from side plate 4 and from legs 16 of tabs 9.

I claim:

1. A cage for an overrunning roller clutch having an energizing spring for each roller, said cage including an annular side plate having axially extending tabs bent from the inner and outer rims thereof, an inner and outer tab together with a respective energizing spring providing retaining means for a roller, characterized in that the length (L) of said inner tab (8) corresponds approximately to the length (1) of a roller (2) and that said inner tab (8) has a lug (12) disposed on a center portion (24) thereof for mounting an energizing spring (3), said lug extending radially with respect to said annular side plate, and in that said outer tabs (9) are provided with legs (16) bent over at their ends which form guiding supports for the rollers (2) extending parallel to side plate (4).

2. A cage for an overrunning roller clutch according to claim 1, characterized in that the energizing springs (3) are provided with U-shaped ends (13) which can be clipped on the lugs (12) of said center portion (24).

3. A cage for an overrunning roller clutch according to claim 1, characterized in that the energizing springs (3) have tongues (14) on their outer legs (23) of U-shaped ends (13) alligned with inner tabs (8) which lockingly mesh into openings (15) in the lugs (12).

4. A cage for an overrunning roller clutch according to claim 3, characterized in that the tongues (14) of springs (3) are directed away from said side plate (4).

5. A cage for an overrunning roller clutch according to claim 1, characterized in that projections (17, 18) on inner tabs (18) and an edge of outer tabs (9) facing the rollers (2) form inner and outer supports for retaining the spring loaded roller when removed from a clutch.

6. A cage for an overrunning roller clutch according to claim 1, characterized in that a rim (5 or 6) of said side plate (4) is provided with projecting portions (11) for insertion into respective recesses in a clutch race and in that a roller support on a tab (9) on the rim having said projecting portion (11) is shifted circumferentially toward the roller with respect to the roller supports on the tab (8) extend from the other rim such that the rollers do not extend beyond the contour of said projecting portions when seated upon said roller supports.

7. A cage for an overrunning roller clutch according to claim 1 characterized in that a rim (6) of the side plate (4) includes projecting portions (11) adapted to engage roller recesses formed by grip ramps (25) and inclined surfaces (22) of a clutch outer race.

8. A cage for an overrunning roller clutch according to claim 1 characterized in that the cage is produced from a flat sheet metal stamping from which said inner and outer tabs (8, 9) are bent sequentially to provide roller retaining means and spring mounting means.

* * * * *